United States Patent [19]
Zeitler et al.

[11] Patent Number: 5,218,058
[45] Date of Patent: Jun. 8, 1993

[54] FLEXIBLE ELASTIC POLYURETHANE FILMS A PROCESS FOR THEIR PREPARATION AND THEIR USE

[75] Inventors: Gerhard Zeitler, Hessheim; Gerhard Lehr, Schwegenheim, both of Fed. Rep. of Germany

[73] Assignee: BASF Aktiengesellschaft, Ludwigshafen, Fed. Rep. of Germany

[21] Appl. No.: 527,512

[22] Filed: May 23, 1990

[51] Int. Cl.$^5$ .................. B29C 47/00; C08G 18/34
[52] U.S. Cl. .................. 525/453; 525/80; 525/96; 525/98; 525/260; 525/333.8; 525/356; 528/65; 528/499; 528/71; 524/496
[58] Field of Search .......... 525/467, 399, 410, 453, 525/80, 96, 98, 260, 333.8, 356; 528/45, 65, 499, 71; 524/496

[56] References Cited

U.S. PATENT DOCUMENTS

| | | | |
|---|---|---|---|
| 4,069,208 | 1/1978 | Hoeschele | 528/52 |
| 4,150,211 | 4/1979 | Müller et al. | 525/467 |
| 4,579,930 | 4/1986 | Kramer et al. | 528/71 |
| 4,597,927 | 7/1986 | Zeitler et al. | 528/65 |
| 4,707,525 | 11/1987 | LaNieve, III et al. | 525/399 |

FOREIGN PATENT DOCUMENTS 1121770 7/1968 United Kingdom .
1435067 5/1976 United Kingdom .

Primary Examiner—John Kight, III
Assistant Examiner—Duc Truong
Attorney, Agent, or Firm—Dennis V. Carmen

[57] ABSTRACT

The present invention deals with flexible elastic polyurethane films, efficaciously having a thickness from 0.3 to 3 mm, prepared by sintering powdered thermoplastic polyurethanes, having:
(a) a melt index of from 50 to 350, measured at 190° C. with a compression force of 21.6 kg, and
(b) a Shore A hardness of from 80 to 98, preferably while using from 0.05 to 1 part by weight of powdered aluminum oxide and/or silica gel per 100 parts by weight of said thermoplastic polyurethane, utilizing a heated mold.

The polyurethane films are preferably used for coating molded articles used in the interior of motor vehicles.

35 Claims, No Drawings

FLEXIBLE ELASTIC POLYURETHANE FILMS A PROCESS FOR THEIR PREPARATION AND THEIR USE

The subject of the present invention is a flexible elastic polyurethane film which is prepared by sintering a powdered thermoplastic polyurethane, henceforth, abbreviated TPU, the TPU having: (a) a melt index of from 50 to 350, measured at 190° C., using a compression force of 21.6 kg, and (b) a Shore A hardness of from 80 to 98. Preferably the process uses from 0.05 to 1 part by weight of finely powdered aluminum oxide and/or silica gel per 100 parts by weight of the TPU, with the help of a heated mold.

The preparation of polyurethane films by casting liquid polyurethane formulations or by extrusion of TPU is known and is described, for example, in the *Plastics Handbook, Polyurethanes,* Volume 7, Second Edition, page 469, edited by Dr. G. Oertel, Carl Hanser Publishers, Munich, Vienna, 1983.

From the liquid formulations, either blocks are cast from which the films are split or the films are prepared directly in a centrifugal process. TPU films having thicknesses of from 0.03 to 0.3 mm typically are prepared by a blowing process and thicker films, for example, up to about 3 mm are prepared by flat-sheet-die extrusion. The aforesaid monograph does not mention the preparation of polyurethane films from TPU by sintering.

Also known is using decorative plastic films in the interior of motor vehicles (R. Pfriender, *Plastics,* 76 1986, 10, pages 960 ff), whereby the plastic molded articles are coated with films or the films or skins are poured in place using foams, preferably polyurethane foam.

When using polyurethane, the surface layers generally are prepared from two component polyurethane systems in an in-mold-coating process. Following this process, the mold heated to about 50° C. is first sprayed with a release agent then the polyurethane duel component coating is applied, and finally the polyurethane substrate is placed in the open mold. This manufacturing technique for the preparation of the corresponding elements is laborious and is often difficult to learn by processing individuals (Dr. M. Wachsmann, *Kunststoffberater,* 10/1987, pages 27-28).

The state-of-the-art illustrates PVC/ABS films typically molded employing a thermoforming process and subsequently, they are foamed in place in a second processing step. PVC films can be prepared following the PVC powder slush process. Here the mold is heated in an oven to about 250° C. then the powdered PVC is uniformly distributed therein and the mold is reheated in the oven to cure the PVC skin. After cooling the mold, for example, in a water bath, the film can be removed and then used for foaming in place. The films prepared according to the PVC powder slush process are substantially cheaper than ABS/PVC films, PU-IMC films, and TPU films. Molded articles having PVC films poured in place using polyurethane foams have a disadvantage in that there is a mutual negative influence of the PVC film and polyurethane poured in place foam. Thus, components such as, for example, catalysts, stabilizers, etc., diffuse from the polyurethane foam into the decorative film and in reverse, and the result is a plasticizer migration from the PVC film into the polyurethane foam. The result of these migration processes is that the molded articles are mechanically damaged, for example, by shrinking or becoming embrittled and the molded articles appearance changes by discoloration and spot formation (Plastics Technology, VDI-publishers GmbH, Düsseldorf, FRG, 1987, *Plastics as a Problem Solver When Building Automobiles,* pages 141 ff.).

The object of the present invention was to prepare films from a suitable plastic employing a cost effective process, which could be easily poured in place using polyurethane foam systems without resulting in a detrimental reciprocal effect between the covering film and polyurethane foam. The covering films should efficaciously have a high light resistance, the molded articles should be temperature resistant and find use in the interior of vehicles for transportation.

This object was surprisingly met with polyurethane films prepared by sintering certain TPU or preferably TPU mixtures.

The subject of the present invention is accordingly elastic polyurethane films obtained by sintering TPU having a melt index of from 50 to 350, measured at 190° C. with a compression force of 21.6 kg (i.e. 212N), more preferably of from 200 to 300, and having a Shore A hardness of from 80 to 98, more preferably 92 to 95.

The polyurethane films of the present invention efficaciously have a thickness of from 0.3 to 3 mm, more preferably 0.6 to 1.2 mm.

The subject of the present invention is also a process for the preparation of said flexible elastic polyurethane films comprising sintering at least one powdered plastic granulate using a tempered mold wherein said powdered plastic granulate is a thermoplastic polyurethane having:

a) a melt index of from 50 to 350 when measured at 190° C. with a compression force of 21.6 kg; and
b) a Shore A hardness of 80 to 98.

The subject of the present invention further comprises using said polyurethane films for coating molded articles used in the interior of vehicles for transportation, preferably automobiles.

Films, in numerous color modifications, having different mechanical properties can be cost-effectively prepared even in relatively small part numbers utilizing the sintering process by appropriately selecting the TPU or mixtures thereof from a number products having a melt index and a hardness in a range specified according to the present invention, for example, TPU prepared while using polyester polyols and/or polyether polyols, and aliphatic and/or aromatic diisocyanates, as well as while using, for example, pigments, stabilizers, antioxidants, or preferably aluminum oxide, silica gel, or mixtures thereof and other auxiliaries and/or additives typical for TPU.

The TPU used according to the present invention has a melt index of from 50 to 350, measured at 190° C., utilizing a compression force of 21.6 kg and having a Shore A hardness of from 80 to 98, corresponding to the state-of-the-art, and said TPU is prepared by reacting at elevated temperatures:

a) organic and/or modified organic diisocyanates, with:
b) polyhydroxyl compounds, preferably essentially linear polyhydroxyl compounds having molecular weights of from 500 to 8,000, most preferably polyalkylene glycol polyadipates having 2 to 6 carbon atoms in the alkylene radical and having molecular weights of from 500 to 6,000 or hydroxyl group containing polytetrahydrofurans having a molecular weight of from 500 to 8,000, and c) diols as chain extending agents having molecular weights of from 60 to 400, most preferably 1,4-butanediol;

in the presence of:

d) catalysts and optionally;
e) auxiliaries and/or;
f) additives.

The following should be noted with respect to starting components (a) through (d) as well as optionally (e) and/or (f):

a) organic diisocyanates (a) are, for example, aliphatic, cycloaliphatic, or more preferably aromatic diisocyanates. Individual examples are: aliphatic diisocyanates, such as hexamethylene-1,6-diisocyanate, 2-methyl-pentamethylene-1,5-diisocyanate, 2-ethyl-butylene-1,4-diisocyanate, or mixtures of of least two of the aforesaid aliphatic diisocyanates; cycloaliphatic diisocyanates such as, for example, isophorone diisocyanate, 1,4-cyclohexane diisocyanate, 1-methyl-2,4-cyclohexane diisocyanate, and 1-methyl-2,6-cyclohexane diisocyanate, as well as the corresponding isomeric mixtures, 4,4'-, 2-4'-, and 2,2'-dicyclohexylmethane diisocyanate as well as the corresponding isomeric mixtures, and preferably aromatic diisocyanates such as, for example, 2,4-toluene iisocyanate, mixtures of 2,4-, and 2,6-toluene diisocyanate, 4,4'-, 2,4'-, and 2,2'-diphenylmethane diisocyanate; mixtures of 2,4'-, and 4,4'-diphenylmethane diisocyanate, urethane modified liquid 4,4'-, and/or 2,4'-diphenylmethane diisocyanate, 4,4'-diisocyanato-1,2-diphenylethane, mixtures of 4,4'-, 2,4'-, and 2,2'-diisocyanato-1,2-diphenylethane, advantageously those comprising at least 95 weight percent of 4,4'-diisocyanato-1,2-diphenylethane and 1,5-naphthylene diisocyanate. Preferably used are diphenylmethane diisocyanate isomeric mixtures having a 4,4'-diphenylmethane diisocyanate content greater than 96 weight percent, and most preferably essentially pure 4,4'-diphenylmethane diisocyanate.

The organic diisocyanates can optionally be replaced to a lesser degree, for example, in quantities up to 3 mole percent, more preferably to 1 mole percent, based on the organic diisocyanate, by a trifunctional polyisocyanate or a higher functional polyisocyanate, however, the quantities must be limited so that polyurethanes are obtained which are still thermoplastic in nature when processed.

Quantities of isocyanates considered more than difunctional are best compensated for by using less than difunctional compounds with reactive hydrogen atoms so that extensive chemical crosslinking of the polyurethane is avoided. Examples of isocyanates regarded as more than difunctional are mixtures of diphenylmethane diisocyanates and polyphenyl polymethylene polyisocyanates, the so-called polymeric-MDI and liquid 4,4'-, and/or 2,4'-diphenylmethane diisocyanate modified with the following groups: isocyanurate, urea, biuret, allophanate, urethane and/or carbodiimide.

Typical monofunctional compounds having reactive hydrogen atoms which also are used as molecular weight regulators are, for example, monoamines such as, for example, butyl-, dibutyl-, octyl-, stearyl-, N-methylstearylamine, pyrrolidone, piperidine, and cyclohexylamine; and monoalcohols such as, for example, butanol, amyl alcohol, 1-ethylhexanol, octanol, dodecanol, cyclohexanol, and ethylene glycol monoethyl ether.

b) Higher molecular weight polyhydroxyl compounds (b) having molecular weights of from 500 to 8,000 are preferably polyether polyols and most preferably, polyester polyols. However, other examples are: hydroxyl group containing polymers with ether and/or ester groups as bridge members, for example, polyacetals such as polyoxymethylenes and particularly water insoluble formals, for example, polybutanediol formal and polyhexanediol formal, and polycarbonates preferably, those from diphenyl carbonate and 1,6-hexanediol prepared by transesterification. The polyhydroxyl compounds must be predominantly linear, i.e., difunctional in the sense that the isocyanate reaction. The aforesaid polyhydroxyl compounds can be used as individual components or in the form of mixtures.

Typical polyether polyols can be prepared according to known processes, for example, by the anionic polymerization with alkali hydroxides such as sodium or potassium hydroxide or alkali alcolates such as sodium methylate, sodium or potassium methylate, or potassium isopropylate as catalysts and while using at least one initiator molecule which contains in bonded form 2 to 3, more preferably 2 active hydrogen atoms; or by the cationic polymerization with Lewis acids such as, for example, antimony pentachloride, boron fluoride etherate, etc., or bleaching earth as catalysts from one or more alkylene oxides having 2 to 4 carbon atoms in the alkylene radical.

Typical alkylene oxides are, for example, preferably tetrahydrofuran, 1,3-propylene oxide, 1,2-, and/or 2,3-butylene oxide, and most preferably ethylene oxide and 1,2-propylene oxide. The alkylene oxides can be used individually, alternating one after another, or as mixtures. Typical initiator molecules are, for example, water, organic dicarboxylic acids such as succinic acid, adipic acid, and/or glutaric acids; alkanolamines, such as, for example, ethanolamine, N-alkylalkanolamine, N-alkyldialkanolamines, such as, for example, N-methyldiethanolamine, and N-ethyldiethanolamine, and preferably, divalent alcohols optionally containing ether bridges in bonded form such as, for example, ethanediol, 1,2-propanediol, and 1,3-propanediol, 1,4-butanediol, diethylene glycol, 1,5-pentanediol, 1,6-hexanediol, dipropylene glycol, 2-methyl-1,5-pentanediol, and 2-ethyl-1,4-butanediol. The initiator molecules can be used individually or as mixtures.

Preferably used are polyether polyols from 1,2-propylene oxide and ethylene oxide in which more than 50 percent, more preferably 60 to 80 percent, of the OH groups are primary hydroxyl groups and in which at least a portion of the ethylene oxide is situated as a terminal block. Such polyether polyols can be obtained, for example, by first polymerizing 1,2-propylene oxide onto the initiator molecule then subsequently polymerizing the ethylene oxide, or first polymerizing the entire 1,2-propylene oxide mixed with a portion of the ethylene oxide and then subsequently polymerizing the remainder of the ethylene oxide, or stepwise that is first a portion of the ethylene oxide then the entire 1,2-propylene oxide and the remainder of the ethylene oxide onto the initiator molecule.

Also preferably used are hydroxyl group containing polymerization products of tetrahydrofuran.

The essentially linear polyether polyols have molecular weights of from 500 to 8,000, more preferably 600 to 6,000, and most preferably 800 to 3,500. They can be used individually or mixed with one another.

Typical polyester polyols can be prepared, for example, from dicarboxylic acids having 2 to 12, more preferably 4 to 6 carbon atoms and from multivalent alcohols.

Typical dicarboxylic acids are, for example: aliphatic dicarboxylic acids, such as, succinic acid, glutaric acid, adipic acid, subaric acid, azelaic acid, and sebacic acid, and aromatic dicarboxylic acids, such as, phthalic acid, isophthalic acid and terephthalic acid. The dicarboxylic acids can be used individually or as mixtures, for example, a mixture of succinic, glutaric, and adipic acids. When preparing the polyester polyols, it optionally can be advantageous to use the corresponding carboxylic acid derivatives in place of the carboxylic acids such as carboxylic acid mono- and/or di- esters having 1 to 4 carbon atoms in the alcohol radical, carboxylic acid anhydrides, or carboxylic acid chlorides. Examples of multivalent alcohols are: glycols having 2 to 10, more preferably 2 to 6 carbon atoms such as ethylene glycol, diethylene glycol, 1,4-butanediol, 1,5-pentanediol, 1,6-hexanediol, 1,10-decanediol, 2,2-dimethyl-1,3-propanediol, 1,3-propanediol, and dipropylene glycol. Depending on the desired properties, the multivalent alcohols can be used individually or optionally mixed with one another.

Also suitable are esters of carboxylic acids with the aforesaid diols, most preferably those having 4 to 6 carbon atoms such as 1,4-butanediol and/or 1,6-hexanediol; condensation products of ω-hydroxycarboxylic acids, for example, ω-hydroxycaproic acid, and preferably polymerization products from lactones, preferably optionally substituted ω-caprolactones.

Polyester polyols preferably used are: ethanediol polyadipates, 1,4-butanediol polyadipates, ethanediol-1,4-butanediol polyadipates, 1,6-hexanediol neopentylglycol polyadipates, 1,6-hexanediol, 1,4-butanediol polyadipates, and polycaprolactones. The polyester polyols have molecular weights of from 500 to 6,000, more preferably 800 to 3,500.

c) Typical chain extending agents (c) having molecular weights of from 60 to 400, more preferably 60 to 300, are, for example, preferably aliphatic diols having 2 to 12 carbon atoms more preferably 2, 4, or 6 carbon atoms, for example, ethanediol, 1,6hexanediol, diethylene glycol, dipropylene glycol, and most preferably 1,4-butanediol. However, also suitable are diesters of terephthalic acids with glycols having 2 to 4 carbon atoms such as, for example, terephthalic acid bis-ethylene glycol or terephthalic acid bis-1,4-butanediol, and hydroxyalkylene ether from hydroquinone, for example, 1,4-di-(β-hydroxyethyl) hydroquinone as well as polytetramethylene glycols having molecular weights of from 162 to 378.

The starting components can be varied in relatively broad molar ratios to adjust hardness and melt index, whereby the hardness and melt viscosity increase with an increasing amount of chain extending agent (c) while the melt index decreases.

When preparing the TPU the essentially linear difunctional polyhydroxyl compounds (b) and diols (c) are advantageously used in mole ratios of from 1:2 to 1:6, more preferably 1:2.5 to 1:4 so that the resulting TPU's have a Shore A hardness of from 80 to 98, more preferably 82 to 95.

d) Typical catalysts which accelerate the reaction between the NCO groups of the diisocyanates (a) and the hydroxyl groups of starting components (b) and (c) are those state-of-the-art catalysts and also conventional tertiary amines such as, for example, triethylamine, dimethylcyclohexylamine, N-methylmorpholine, N,N'-diethylpiperazine, diazabicyclo[2.2.2]octane and the like, as well as preferably organic metal compounds such as titanium acid ester, iron compounds, tin compounds, for example, tin diacetate, tin dioctoate, tin dilaurate, or tin dialkyl salts of aliphatic carboxylic acids such as, for example, dibutyltin acetate, dibutyltin dilaurate, or the like. Catalysts are generally used in quantities of from 0.001 to 0.1 parts by weight per 100 parts by weight of the mixture of polyhydroxyl compounds (b) and diols (c).

Auxiliaries (e) and /or additives (f) in addition to the catalysts can also be added to the starting components. Typical examples are: lubricants, inhibitors, stabilizers against hydrolysis, light, heat, or discoloration, flame retardants, dyes, pigments, and inorganic and/or organic fillers.

The auxiliaries (e) and/or additives (f) can be added to the starting components or to the reaction mixture when preparing the TPU. Following another process variation, auxiliaries (e) and/or additives (f), can be mixed with the TPU and subsequently melted together. The latter method is particularly used for adding aluminum oxide and/or silica gel and optionally reinforcing fillers.

Additional information concerning auxiliaries and/or additives can be found in the technical literature, for example, in the monograph of J. H. Saunders and K. C. Frisch *High Polymers*, Vol. XVI, Polyurethanes, Parts 1 and 2, Interscience Publishers 1962 and 1964, or in the *The Plastics Handbook*, Vol. 7, Polyurethanes, First and Second Editions, Carl Hanser Publishers, 1966 and 1983 or in DE-OS 29 01 774.

When preparing the TPU, starting components (a), (b), and (c) are reacted in the presence of catalysts (d) and optionally auxiliaries (e) and/or additives (f) in such quantities so that the equivalent ratio of NCO groups from said diisocyanates to the total of the hydroxyl groups from components (b) and (c) is from 0.80 to 1.20:1, more preferably 0.95 to 1.05:1, and most preferably about 1:1.

TPU used according to the present invention, having a melt index of from 50 to 350, more preferably 200 to 300, measured at 190° C. with a compression force of 212N (21.6kp), can be prepared following an extruder process or more preferably a conveyor process batchwise or by continuously mixing starting components (a) through (d) as well as optionally (e) and (f); allowing the reaction mixture to cure in an extruder or on a conveyor belt at temperatures of from 60° to 250° C., more preferably 70° to 150° C.; and subsequently granulating the resulting TPU (A). Optionally it also can be advantageous to temper the resulting TPU before further processing into TPU molded articles of the present invention at 80° to 120° C., more preferably 100° to 110° C. from 1 to 24 hours.

The TPU, as already cited, is preferably prepared according to a conveyor process. Here the starting components (a) through (d) and optionally (e) and/or (f) are mixed at temperatures above the melt point of starting components (a) through (c) continuously with the help of a mix head. The reaction mixture is applied onto a carrier preferably a conveyor belt made of, for example, metal at a rate of from 1 to 20 meters per minute, more preferably 4 to 10 meters per minute, and is fed through a heating zone 1 to 20 meters in length, more preferably 3 to 10 meters in length. The reaction temperature in the heating zone is 60° to 200° C., more preferably 80° to 180° C. Depending on the diisocyanate portion in the reaction mixture, the reaction is controlled by heating or cooling so that at least 90 percent, more preferably at least 98 percent, of the isocyanate groups of the diisocyanates react and the reaction mixture cures at the selected reaction temperature. Due to the free isocyanate groups in the cured reaction product, which based on the total weight range from 0.05 to 1 weight percent, more preferably 0.1 to 0.5 weight percent, TPU is obtained having a very low melt viscosity and/or a high melt index.

As already indicated, it has proven advantageous, for example, to modify the mechanical properties of the resulting films or their light stability depending on their use, by using mixtures of two or more TPU's in certain experimentally reported quantities in place of one TPU.

When selecting the TPU, one must ensure that the resulting mixture fulfills the specific criteria of the present invention with respect to melt index and hardness. This means that in the preparation of the TPU mixture, even TPU can be used which as an individual component does not fulfill the selection criteria of the present invention and accordingly is unusable by itself in the preparation of polyurethane films prepared by sintering.

For example, black films can be prepared from TPU's, based on aromatic diisocyanates, more preferably 4,4'-diphenylmethane diisocyanate, and almost any polyhydroxyl compounds (b) and diols (c). TPU, based on aliphatic diisocyanates is indeed light stable, however, crystallizes relatively difficultly and thus, is difficult to handle in thermoplastic processing. By mixing TPU, based on aromatic diisocyanates, with TPU, based on aliphatic and/or cycloaliphatic diisocyanates, films, for example, can be obtained having improved light resistance without having the TPU mixture demonstrate any significant adhesion to the mold when processing. According to this method, films can be obtained from TPU from aromatic and aliphatic and/or cycloaliphatic diisocyanates having a light stability sufficient for other color formulations. The films are surprisingly essentially completely tack free.

In a similar fashion, for example, the mechanical properties of films, their oxidation stability, or hydrolysis stability, can be easily modified by properly selecting the TPU from different polyhydroxyl compounds especially those from polyether polyols or polyester polyols and in addition depending on the selection of the diisocyanate, as already indicated, light stability can be modified.

TPU mixtures, based on 100 parts by weight, which have proven successful, and which are therefore preferably used for the preparation of said elastic flexible polyurethane films, comprise:

A) 40 to 99.5 parts by weight, more preferably 60 to 85 parts by weight of a TPU (A), prepared while using aromatic diisocyanates, more preferably 4,4'-diphenylmethane diisocyanate; and B) 0.5 to 60 parts by weight, more preferably 15 to 40 parts by weight of a TPU (B), prepared while using aliphatic diisocyanates, more preferably selected from the group consisting of 1,6-hexamethylene diisocyanate, isophorone diisocyanate, 4,4'-dicyclohexylmethane diisocyanate, and mixtures of at least 2 of the aforesaid diisocyanates; or TPU mixtures, based on 100 parts by weight, comprising:

I) 60 to 99.5 parts by weight, more preferably 70 to 90 parts by weight of a TPU, prepared while using at least one polyoxyalkylene glycol, for example, a polyoxypropylene glycol, a polyoxypropylene-polyoxyethylene glycol, or a polyoxytetramethylene glycol; and II) 0.5 to 40 parts by weight, more preferably 10 to 30 parts by weight of a TPU, prepared while using polyester diols, more preferably polyalkylene glycol polyadipates having 2 to 6 carbon atoms in the alkylene glycol radical;

as well as, most preferably TPU mixtures, based on 100 parts by weight, comprising:

AI) 60 to 95 parts by weight, more preferably 70 to 90 parts by weight of a TPU, prepared while using 4,4'-diphenylmethane diisocyanate and a polyoxytetramethylene glycol having a molecular weight ranging from 600 to 3,500; and BII) 5 to 40 parts by weight, more preferably 10 to 30 parts by weight of a TPU, prepared while using isophorone diisocyanate and a polyester diol, preferably a polyalkylene glycol polyadipate having a molecular weight ranging from 800 to 3,500.

The TPU of the present invention suitable for sintering in the preparation of films is efficaciously reduced in size by means of suitable conventional equipment, for example, mills; and sintered employing an average particle size distribution from 50 to 800 microns, more preferably 100 to 500 microns.

In order to improve the free flowing ability of this TPU powder and especially to reduce the flowability of the TPU melt on vertical or overheated mold surfaces, efficaciously powdered aluminum oxide or, more preferably powdered silica gel as well as optionally mixtures of aluminum oxide and silica gel are incorporated into the powdered TPU. TPU melt runoff when sintering on vertical mold surfaces or runoff of overheated mold surfaces in conjunction with the formation of thin spots or holes in films, can be avoided even by adding from 0.05 to 1 part by weight, more preferably 0.1 to 0.3 parts by weight of aluminum oxide and/or silica gel, based on 100 parts by weight of the TPU powder. With the help of this preferred process variation, films can be prepared having a very uniform thickness distribution.

As already indicated, auxiliaries and/or additives can also be incorporated into the TPU or TPU powders.

Examples are fillers, for example, organic fillers such as, for example, carbon black and melamine and inorganic fillers such as, for example, quartz powder, talc, amorphous silica gel, or mixtures thereof.

Flame retardants are, for example: melamine, polyhalidediphenyl, polyhalidediphenyl ether, polyhalidephthalic acid, and their derivatives, polyhalide oligocarbonates and polyhalide polycarbonates whereby the corresponding bromine compounds are particularly effective. Also suitable as flame retardants are phosphorus compounds such as elemental phosphorus or organic phosphorus compounds. In addition, generally the flame retardants also contain a synergist, for example, antimony trioxide.

Typical oxidation retardants and heat stabilizers are, for example, halides of metals from group I of the periodic chart, for example, sodium, potassium, and lithium halides optionally used in conjunction with copper (I) halides, for example, chlorides, bromides, or iodides; sterically hindered phenols, hydroquinones, as well as substituted compounds of this group and mixtures thereof, which are preferably used in concentrations up to 1 weight percent, based on the weight of the TPU.

Typical, UV stabilizers are different substituted resorcines, salicylates, benzotriazoles, and benzophenones as well as sterically hindered amines which generally are used in quantities up to 2.0 weight percent, based on the weight of the TPU.

Demolding agents, which generally are added in quantities up to 1 weight percent, based on the weight on the TPU, include: stearic acids, stearic alcohol, stearic acid esters, and stearic acid amides, as well as the fatty acid ester of pentaerythitol. In addition organic dyes such as Nigrosin, and pigments such as, for example, titanium dioxide, calcium sulfide, calcium sulfide selenide, phthalocyanine, Ultramarine Blue or carbon black can be added.

When preparing the flexible elastic polyurethane films, the mold, preferably a galvano mold, is heated in a suitable device, for example, an oven to a temperature of from 220° to 280° C., more preferably 230° to 270° C. Then the powdered TPU having an average particle size of from 50 to 800 microns, preferably in the presence of aluminum oxide and/or silica gel with respect to the desired film thickness, is applied in a sufficient quantity onto the mold's surface then following brief contact, for example, preferably 16 to 25 seconds, the excess TPU powder is shaken off. The TPU powder layer adhering to the mold is then allowed to cure by means of the heat capacity of the mold or by rewarming, for example, by heating in an oven or by radiation at a temperature in the range previously cited. After cooling the mold, for example, in the air, in an optionally cooled inert gas and/or air stream, or in a water bath, the film formed can be removed from the mold, briefly stored or directly utilized for pouring in place foaming, preferably using polyurethane foam.

The polyurethane films prepared according to the present invention are flexible and elastic, they have a thickness of from 0.3 to 3 mm, corresponding to a weight per unit area of from 360 to 3,600 g/m$^2$ and they are characterized by possessing excellent mechanical properties especially a high tear strength. Moreover, they feel dry and are almost completely odorless.

Since a reciprocal effect between the polyurethane film and polyurethane foam does not occur, the films are especially suited for pouring in place foaming with flexible elastic, semi-flexible, or preferably rigid polyurethane foams. Such molded articles coated with polyurethane films of the present invention are used, for example, as instrument panels, column or door coverings, sun visors glove compartments, consoles, shelves, and molded headliners in the interior of transportation vehicles, preferably in motor vehicles.

EXAMPLE 1

Preparation of a Beige Colored Polyurethane Film

A mixture, prepared at room temperature comprising:

- 78 parts by weight of TPU having a Shore A hardness of 90 and having a melt index of 280, measured at 190° C. and with a compression force of 21.6 kg, prepared by reacting 1 mole of polyoxytetramethylene glycol having a molecular weight of 1,000, 4 moles of 4,4'-diphenylmethane diisocyanate and 3 moles of 1,4-butanediol following a conveyor process;
- 18 parts by weight of a TPU having a Shore A hardness of 85 and a melt index of 180, measured at 190° C. with a compression force of 21.6 kg, prepared by reacting 1 mole of a 1,4-butanediol polyadipate having a molecular weight of 2,000, 3 moles of isophorone diisocyanate and 2 moles of 1,4-butanediol following a conveyor process; 0.75 parts by weight of titanium dioxide;
- 3.0 parts by weight of Sicotangelb ® K 2011;
- 0.18 parts by weight of iron(II)oxide;
- 0.3 parts by weight of Tinuvin ® 144 as an UV stabilizer; and
- 0.3 parts by weight of Irganox ® 1010 as an oxidation stabilizer was melted together at 210° C. in a twin-screw extruder under appropriate process conditions so that the resulting granulate had a Shore A hardness of 88 and a melt index of 310 measured at 190° C. with a compression force of 21.6 kg.

The resulting TPU granulate was ground with the help of a baffle-plate impact mill to an average particle size between 100 and 500 microns and 100 parts by weight thereof was homogeneously mixed with 0.15 weight percent of finely divided silica gel.

The homogeneous TPU silica gel mixture was applied in a conventional fashion onto a mold heated to 250° C., following a contact time of 20 seconds the excess TPU powder was shaken off and subsequently the TPU remaining on the mold was sintered 2 minutes at 250° C. After cooling the mold in a water bath, the polyurethane film was removed.

The resulting polyurethane film having a thickness of 0.6 mm was flexible and elastic and revealed no signs of voids or holes.

EXAMPLE 2

A mixture, prepared at room temperature, comprising:

- 72 parts by weight of a TPU having a Shore A hardness of 85 and a melt index of 230 measured at 190° C. and with a compression force of 21.6 kg, prepared by reacting 1 mole of polyoxytetramethylene glycol having a molecular weight of 1,000, 3.5 moles of 4,4'-diphenylmethane diisocyanate and 2.5 moles of 1,4-butanediol following a conveyor process;
- 24 parts by weight of a TPU having a Shore A hardness of 85 and a melt index of 180 measured at 190° C. and with a compression force of 21.6 kg, prepared by reacting 1 mole of a 1,4-butanediol polyadipate having a molecular weight of 2,000, 3 moles of isophorone diisocyanate and 2 moles of 1,4-butanediol following a conveyor process;
- 0.65 parts by weight of Ultramarine Blue;
- 0.24 parts by weight of light yellow;
- 0.12 parts by weight of Heliogengrün ®;
- 0.20 parts by weight of carbon black;
- 0.40 parts by weight of titanium dioxide;
- 0.79 parts by weight of chalk (Microcalcilin ®);
- 0.8 parts by weight of Irganox ® 1010 as an oxidation stabilizer; and
- 0.8 parts by weight of Tinuvin ® 328 as an UV stabilizer was melted together at 212° C. in a twin-screw extruder of the type ZSK. The resulting granulate had a Shore A hardness of 85 and melt index of 220 measured at 190° C. with a compression force of 21.6 kg.

The powder, therefrom, was prepared using a pinned disc mill while adding liquid nitrogen and had an average particle size of from 100 to 500 microns. 0.1 weight percent of finely divided silica gel was homogeneously mixed with the powder for processing.

The powder mixture was processed analagous to the details of example 1 into a film having a thickness of 0.8 mm, however, while employing a mold temperature of 240° C.

EXAMPLE 3

A mixture, prepared at room temperature, comprising:
- 98 parts by weight of a TPU having a Shore A harness of 90 and a melt index of 280, measured at 190° C. with a compression force of 21.6 kg, prepared by reacting 1 mole of polyoxytetramethylene glycol having a molecular weight of 1,000, 4 moles of 4,4'-diphenylmethane diisocyanate and 3 moles of 1,4-butanediol following a conveyor process;
- 1.0 parts by weight of Special Black 4;
- 0.1 parts by weight of iron(II)oxide (Bayer Ferrox);
- 0.5 parts by weight of Irganox® 1010; and
- 0.4 parts by weight of Tinuvin® 328 was melted together at 220° C. in a twin-screw extruder. The resulting granulate had a Shore A hardness of 91 and a melt index of 245, measured at 190° C. with a compression force of 21.6 kg.

A powder was prepared from the granulate in the manner described in example 1. The powder had an average particle size between 100 and 500 microns. 0.12 weight percent of finely divided silica gel was added the powder. A polyurethane film having a thickness of 0.6 mm was prepared utilizing a mold temperature of 270° C. and a contact time of 15 seconds. The surface of the film was unobjectionable and revealed no signs of voids.

We claim:

1. A flexible, elastic polyurethane film prepared by sintering a thermoplastic polyurethane in the presence of aluminum oxide and/or silica gel, said thermoplastic polyurethane having a melt index of from 50–350 when measured at 190° C. and a compression force of 21.6 kg; and a Shore A hardness of from 80–98; and prepared by reacting:
   (a) an organic and/or modified organic diisocyanate, with
   (b) a polyhydroxyl compound having a molecular weight of from 500–8,000 and
   (c) a diol having a molecular weight of from 60–400, which acts as a chain extender, in the presence of
   (d) a catalyst and, optionally,
   (e) auxiliaries and/or additives.

2. A flexible, elastic polyurethane film as described in claim 1 wherein the film has a thickness of from 0.3 to 3 millimeters.

3. A flexible, elastic polyurethane film as described in claim 1 wherein said film is prepared by sintering powdered, thermoplastic polyurethane having an average particle size of from 50 to 800 microns in a mold heated to from 220° to 280° C.

4. A flexible, elastic polyurethane film as described in claim 2 wherein said film is prepared by sintering powdered, thermoplastic polyurethane having an average particle size of from 50 to 800 microns in a mold heated to from 220° to 280° C.

5. A flexible, elastic polyurethane film as described in claims 1 wherein said sintering is done in the presence of from 0.05 to 1 part by weight of aluminum oxide and/or silica gel per 100 parts by weight of said thermoplastic polyurethane.

6. A flexible, elastic polyurethane film as described in claim 2 wherein said sintering is done in the presence of from 0.05 to 1 part by weight of aluminum oxide and/or silica gel per 100 parts by weight of said thermoplastic polyurethane.

7. A flexible, elastic polyurethane film as described in claim 3 wherein said sintering is done in the presence of from 0.05 to 1 part by weight of aluminum oxide and/or silica gel per 100 parts by weight of said thermoplastic polyurethane.

8. A flexible, elastic polyurethane film as described in claim 1 wherein a mixture of the following is used as said thermoplastic polyurethane, based on 100 parts by weight:
   A) 40 to 99.5 parts by weight of a thermoplastic polyurethane (A) prepared while using an aromatic diisocyanate;
   B) 0.05 to 60 parts by weight of a thermoplastic polyurethane (B) prepared while using aliphatic diisocyanates.

9. A flexible, elastic polyurethane film as described in claim 2 wherein a mixture of the following is used as said thermoplastic polyurethane, based on 100 parts by weight:
   A) 40 to 99.5 parts by weight of a thermoplastic polyurethane (A) prepared while using an aromatic diisocyanate;
   B) 0.05 to 60 parts by weight of a thermoplastic polyurethane (B) prepared while using aliphatic diisocyanates.

10. A flexible, elastic polyurethane film as described in claim 3 wherein a mixture of the following is used as said thermoplastic polyurethane, based on 100 parts by weight:
    A) 40 to 99.5 parts by weight of a thermoplastic polyurethane (A) prepared while using an aromatic diisocyanate;
    B) 0.05 to 60 parts by weight of a thermoplastic polyurethane (B) prepared while using aliphatic diisocyanates.

11. A flexible, elastic polyurethane film as described in claim 5 wherein a mixture of the following is used as said thermoplastic polyurethane, based on 100 parts by weight:
    A) 40 to 99.5 parts by weight of a thermoplastic polyurethane (A) prepared while using an aromatic diisocyanate;
    B) 0.05 to 60 parts by weight of a thermoplastic polyurethane (B) prepared while using aliphatic diisocyanates.

12. A flexible, elastic polyurethane film as described in claim 8 wherein a mixture of the following is used as said thermoplastic polyurethane, based on 100 parts by weight:
    A) 40 to 99.5 parts by weight of a thermoplastic polyurethane (A) prepared with 4,4'-diphenylmethane diisocyanate;
    B) 0.05 to 60 parts by weight of a thermoplastic polyurethane (B) prepared with an aliphatic diisocyanate selected from the group consisting of 1,6-hexamethylene diisocyanate, isophorone diisocyanate and 4,4'-dicyclohexylmethane diisocyanate.

13. A flexible, elastic polyurethane film as described in claim 1 wherein a mixture of the following is used as said thermoplastic polyurethane, based on 100 parts by weight:

(I) 60 to 99.5 parts by weight of a thermoplastic polyurethane (I) prepared while using polyoxyalkylene glycols; and (II) 0.5 to 40 parts by weight of a thermoplastic polyurethane (II) prepared while using at least one polyester diol.

14. A flexible, elastic polyurethane film as described in claim 2 wherein a mixture of the following is used as said thermoplastic polyurethane, based on 100 parts by weight:

(I) 60 to 99.5 parts by weight of a thermoplastic polyurethane (I) prepared while using polyoxyalkylene glycols; and (II) 0.5 to 40 parts by weight of a thermoplastic polyurethane (II) prepared while using at least one polyester diol.

15. A flexible, elastic polyurethane film as described in claim 3 wherein a mixture of the following is used as said thermoplastic polyurethane, based on 100 parts by weight:

(I) 60 to 99.5 parts by weight of a thermoplastic polyurethane (I) prepared while using polyoxyalkylene glycols; and (II) 0.5 to 40 parts by weight of a thermoplastic polyurethane (II) prepared while using at least one polyester diol.

16. A flexible, elastic polyurethane film as described in claim 5 wherein a mixture of the following is used as said thermoplastic polyurethane based on 100 parts by weight:

(I) 60 to 99.5 parts by weight of a thermoplastic polyurethane (I) prepared while using polyoxyalkylene glycols; and (II) 0.5 to 40 parts by weight of a thermoplastic polyurethane (II) prepared while using at least one polyester diol.

17. A flexible, elastic polyurethane film as described in claim 8 wherein a mixture of the following is used as said thermoplastic polyurethane based on 100 parts by weight:

(I) 60 to 99.5 parts by weight of a thermoplastic polyurethane (I) prepared while using polyoxyalkylene glycols; and (II) 0.5 to 40 parts by weight of a thermoplastic polyurethane (II) prepared while using at least one polyester diol.

18. A flexible, elastic polyurethane film as described in claim 1 wherein a mixture of the following is used as said thermoplastic polyurethane, based on 100 parts by weight:

(AI) 60 to 95 parts by weight of a thermoplastic polyurethane prepared while using 4,4'-diphenylmethane diisocyanate and a polyoxytetramethylene glycol having an average molecular weight of from 500 to 8,000; and (BII) 5 to 40 parts by weight of a thermoplastic polyurethane prepared while using isophorone diisocyanate and a polyester diol.

19. A flexible, elastic polyurethane film as described in claim 2 wherein a mixture of the following is used as said thermoplastic polyurethane, based on 100 parts by weight:

(AI) 60 to 95 parts by weight of a thermoplastic polyurethane prepared while using 4,4'-diphenylmethane diisocyanate and a polyoxytetramethylene glycol having an average molecular weight of from 500 to 8,000; and (BII) 5 to 40 parts by weight of a thermoplastic polyurethane prepared while using isophorone diisocyanate and a polyester diol.

20. A flexible, elastic polyurethane film as described in claim 3 wherein a mixture of the following is used as said thermoplastic polyurethane, based on 100 parts by weight:

(AI) 60 to 95 parts by weight of a thermoplastic polyurethane prepared while using 4,4'-diphenylmethane diisocyanate and a polyoxytetramethylene glycol having an average molecular weight of from 500 to 8,000; and (BII) 5 to 40 parts by weight of a thermoplastic polyurethane prepared while using isophorone diisocyanate and a polyester diol.

21. A flexible, elastic polyurethane film as described in claim 5 wherein a mixture of the following is used as said thermoplastic polyurethane, based on 100 parts by weight:

(AI) 60 to 95 parts by weight of a thermoplastic polyurethane prepared while using 4,4'-diphenylmethane diisocyanate and a polyoxytetramethylene glycol having an average molecular weight of from 500 to 8,000; and (BII) 5 to 40 parts by weight of a thermoplastic polyurethane prepared while using isophorone diisocyanate and a polyester diol.

22. A flexible, elastic polyurethane film as described in claim 8 wherein a mixture of the following is used as said thermoplastic polyurethane, based on 100 parts by weight:

(AI) 60 to 95 parts by weight of a thermoplastic polyurethane prepared while using 4,4'-diphenylmethane diisocyanate and a polyoxytetramethylene glycol having an average molecular weight of from 500 to 8,000; and (BII) 5 to 40 parts by weight of a thermoplastic polyurethane prepared while using isophorone diisocyanate and a polyester diol.

23. A flexible, elastic polyurethane film as described in claim 13 wherein a mixture of the following is used as said thermoplastic polyurethane, based on 100 parts by weight:

(AI) 60 to 95 parts by weight of a thermoplastic polyurethane prepared while using 4,4'-diphenylmethane diisocyanate and a polyoxytetramethylene glycol having an average molecular weight of from 500 to 8,000; and (BII) 5 to 40 parts by weight of a thermoplastic polyurethane prepared while using isophorone diisocyanate and a polyester diol.

24. A flexible, elastic polyurethane film as described in claim 18 wherein a mixture of the following is used as said thermoplastic polyurethane, based on 100 parts by weight:

(AI) 60 to 95 parts by weight of a thermoplastic polyurethane prepared while using 4,4'-diphenylmethane diisocyanate and a polyoxytetramethylene glycol having an average molecular weight of from 500 to 8,000; and (BII) 5 to 40 parts by weight of a thermoplastic polyurethane prepared while using an alkanediol polyadipate having a molecular weight of from 500 to 6,000.

25. A process for the preparation of a flexible, elastic polyurethane film comprising sintering at least one powdered plastic granulate in the presence of at least one flow aid selected from the group consisting of aluminum oxide and silica gel using a tempered mold wherein said powdered plastic granulate is a thermoplastic polyurethane having:
 (a) a melt index of from 50 to 350 when measured at 190° C. with a compression force of 21.6 kg; and
 (b) a Shore A hardness of 80 to 98, wherein said granulate has an average particle size of from 50–80 microns and wherein said granulate is sintered in said mold at a temperature of from 220°–280° C.

26. A process as described in claim 25 wherein the flow aid is present in an amount of from 0.5 to 1 part by weight per 100 parts by weight of the thermoplastic polyurethane.

27. A process as described in claim 26 wherein the flow aid is silica gel.

28. The use of a flexible, elastic polyurethane film as described in claim 1 wherein the film is used for coating molded articles employed in the interior of vehicles of commerce.

29. The use of a flexible, elastic polyurethane film as described in claim 2 wherein the film is used for coating molded articles employed in the interior of vehicles of commerce.

30. The use of a flexible, elastic polyurethane film as described in claim 3 wherein the film is used for coating molded articles employed in the interior of vehicles of commerce.

31. The use of a flexible, elastic polyurethane film as described in claim 5 wherein the film is used for coating molded articles employed in the interior of vehicles of commerce.

32. The use of a flexible, elastic polyurethane film as described in claim 8 wherein the film is used for coating molded articles employed in the interior of vehicles of commerce.

33. The use of a flexible, elastic polyurethane film as described in claim 13 wherein the film is used for coating molded articles employed in the interior of vehicles of commerce.

34. The use of a flexible, elastic polyurethane film as described in claim 18 wherein the film is used for coating molded articles employed in the interior of vehicles of commerce.

35. The use of the polyurethane film as described in claim 28, wherein the vehicle of commerce is an automobile.

* * * * *